(12) United States Patent
Havican et al.

(10) Patent No.: US 9,288,336 B2
(45) Date of Patent: *Mar. 15, 2016

(54) MANAGEMENT OF RECORDS FOR AN ELECTRONIC DEVICE

(71) Applicant: International Business Machines Corporation, Armonk, NY (US)

(72) Inventors: David J. Havican, Westford, MA (US); Sean L. Stuckless, London (CA); Timothy J. Thompson, St. Thomas (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/476,074

(22) Filed: Sep. 3, 2014

(65) Prior Publication Data

US 2015/0056948 A1 Feb. 26, 2015

Related U.S. Application Data

(63) Continuation of application No. 13/973,091, filed on Aug. 22, 2013, now Pat. No. 9,113,000.

(51) Int. Cl.
*H04M 15/00* (2006.01)
*H04W 64/00* (2009.01)
(Continued)

(52) U.S. Cl.
CPC ......... *H04M 15/44* (2013.01); *G06F 17/30345* (2013.01); *G06F 21/6227* (2013.01);
(Continued)

(58) Field of Classification Search
CPC .................... G06F 17/30902; G06F 17/30395; G06F 17/30964

USPC .......... 379/93.25, 90.01, 93.02, 93.03, 93.05, 379/93.06, 93.07, 106.01; 709/219, 223; 707/999.01, 10
See application file for complete search history.

(56) References Cited

U.S. PATENT DOCUMENTS 6,421,717 B1 7/2002 Kloba et al.
8,121,585 B2 2/2012 Commarford et al.
(Continued)

FOREIGN PATENT DOCUMENTS

WO 2004042606 A2 5/2004
WO 2006102473 A2 9/2006
WO 2011090598 A3 7/2011

OTHER PUBLICATIONS

LANSA, "Building Business Applications for Mobile Devices", a LANSA White Paper, Feb. 2012, pp. 1-11, V1.0, © 2012 LANSA.
(Continued)

*Primary Examiner* — Melur Ramakrishnaiah
(74) *Attorney, Agent, or Firm* — Jonathan V. Sry

(57) ABSTRACT

A method, computer system, and computer-readable storage media are provided. The method can include identifying a set of one or more rules in response to an offline event for the remote device. The method can also include determining, based upon the offline event, one or more usage factors from one or more rules that identify at least one usage factor. The method can also include measuring, using the remote device, the determined one or more usage factors. The method can also include generating a filter from the set of one or more rules based off the measured one or more usage factors. The method can also include filtering the plurality of records from the online-accessible database to produce a set of filtered records. The method can also include transmitting the set of filtered records to the remote device.

8 Claims, 7 Drawing Sheets

(51) Int. Cl.
*G06F 17/30* (2006.01)
*H04W 4/02* (2009.01)
*G06F 21/62* (2013.01)

(52) U.S. Cl.
CPC .............. *H04M15/58* (2013.01); *H04M 15/62* (2013.01); *H04M 15/70* (2013.01); *H04M 15/74* (2013.01); *H04W 4/02* (2013.01); *H04W 64/006* (2013.01); *G06F 2221/2111* (2013.01)

(56) References Cited

U.S. PATENT DOCUMENTS

| | | | |
|---|---|---|---|
| 2003/0006913 A1* | 1/2003 | Joyce et al. | 340/994 |
| 2006/0089152 A1 | 4/2006 | Mahonen | |
| 2006/0095434 A1 | 5/2006 | McCullough et al. | |
| 2009/0228545 A1 | 9/2009 | Mendez et al. | |
| 2009/0282125 A1 | 11/2009 | Jeide et al. | |
| 2011/0276608 A1 | 11/2011 | O'Farrell et al. | |
| 2012/0239704 A1 | 9/2012 | O'Farrell et al. | |
| 2014/0004886 A1* | 1/2014 | Gillett et al. | 455/456.6 |
| 2014/0188616 A1* | 7/2014 | Badenhop | 705/14.58 |

OTHER PUBLICATIONS

Havican et al., "Management of Records for an Electronic Device", U.S. Appl. No. 13/973,091, filed Aug. 22, 2013.

* cited by examiner

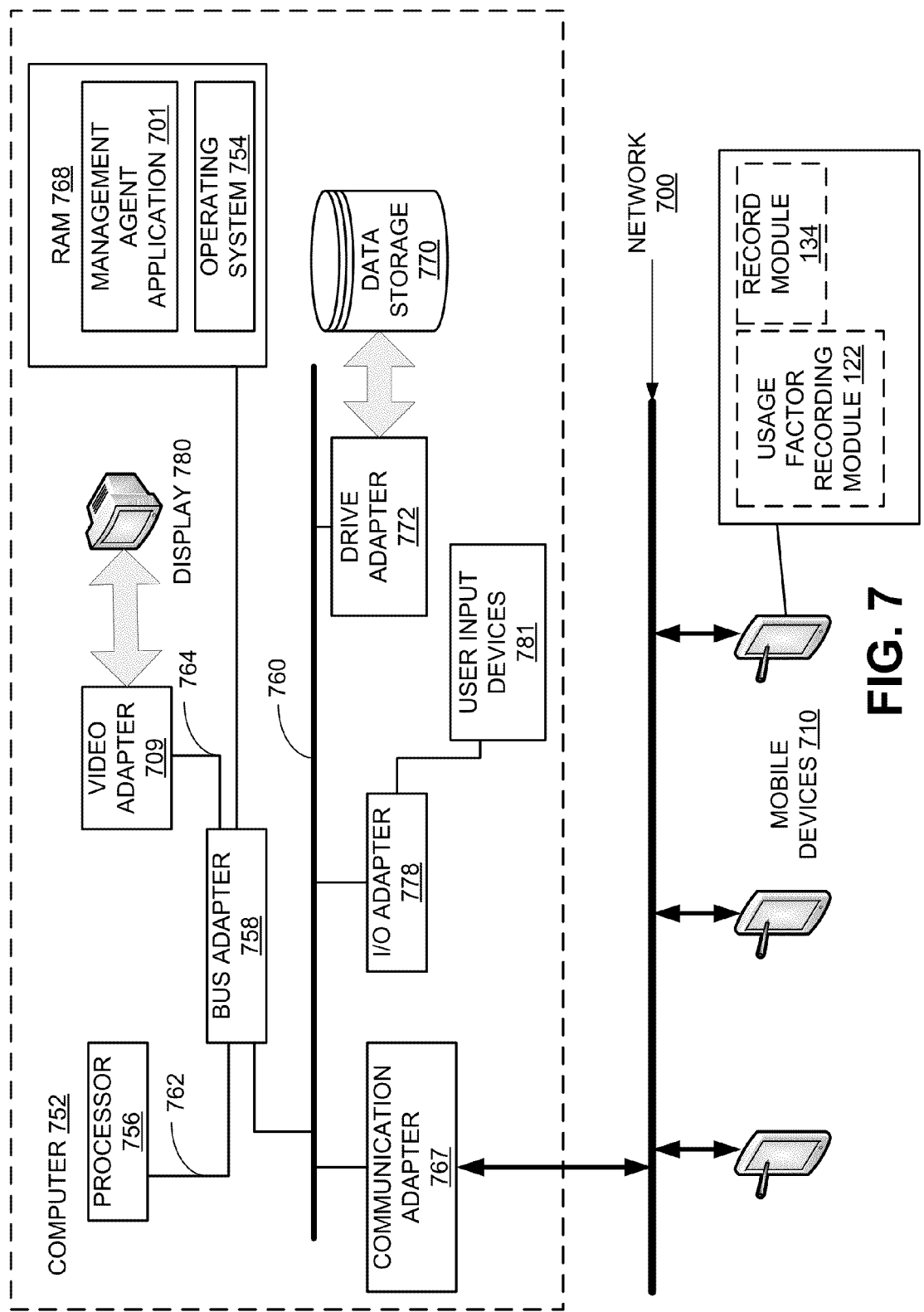

MANAGEMENT OF RECORDS FOR AN ELECTRONIC DEVICE

TECHNICAL FIELD

This disclosure generally relates to mobile computing systems, and in particular, to a method of sharing mobile applications using a cloud computing environment.

BACKGROUND

With the proliferation of mobile devices, remote or off-site application interaction is becoming a basic requirement for enterprise applications. Although wireless communication networks are expanding at an incredible rate, there still exists situations where connectivity is unavailable either due to physical location (deep in a mine, a ship in the middle of the ocean) or security restrictions (secure room or airplane).

In these cases, loss of connectivity may not be short-term but rather a long-term planned event. While disconnected from a network, many enterprise applications can require a mobile device to perform data modification in order to complete a specific application task. Completion of a maintenance work-order, for example, may require information about the location, item to be worked on, related items or components, tools, maintenance history and so on.

SUMMARY

Embodiments of the disclosure provide for a computer-implemented method for controlling data transmission between an online-accessible database containing a plurality of records and a remote device. The method can include identifying a set of one or more rules in response to an offline event for the remote device. The method can also include determining, based upon the offline event, one or more usage factors from one or more rules that identify at least one usage factor. The method can also include measuring, using the remote device, the determined one or more usage factors. The method can also include generating a filter from the set of one or more rules based off the measured one or more usage factors. The method can also include filtering the plurality of records from the online-accessible database to produce a set of filtered records. The method can also include transmitting the set of filtered records to the remote device.

Embodiments of the disclosure also provide for a computing system for filtering a plurality of records and transmitting one or more filtered records from the plurality of records to a remote device. The computing system can include an online-accessible record database containing the plurality of records. The computing system can include a usage factor database containing one or more usage factors. The computing system can include one or more computer processors. The one or more computer processors can include a rule module containing one or more rules. Each rule can have a condition and a response to the condition. The rule module can have a rule module extractor configured to determine, from the condition of the rule, the usage factors for the remote device. The one or more computer processors can have a filter module configured to filter, responsive to an offline event and based on a comparison of the rule with the usage factor, the plurality of records to create a filtered record. The filter module can also transmit the filtered record to a remote device.

Embodiments of the disclosure can also be directed toward a computer program product.

BRIEF DESCRIPTION OF THE DRAWINGS

Embodiments are illustrated by way of example, and not by way of limitation, in the figures of the accompanying drawings in which like reference numerals refer to similar elements or steps.

FIG. 7 depicts a block diagram of automated computing machinery, according to an embodiment.

DETAILED DESCRIPTION

Aspects of the present disclosure relate to filtering data from a database and transmitting the filtered data to a remote device for offline use. The filter can be based on one or more rules. Usage factors can be derived from the rules and the usage factors can be measured by the remote device. The usage factors can determine whether a particular rule is implemented. While the present invention is not necessarily limited to such applications, various aspects of the invention may be appreciated through a discussion of various examples using this context.

A rule can have a condition and a response to the condition. When a condition, e.g., location, is satisfied by a remote device, then a computer, e.g., a server, can implement the response to the condition. The response to the condition can be an action that the computer takes, e.g., filtering values in the database in response to a location condition.

The store-and-forward model of data replication when applied to mobile devices introduces several challenges regarding storage capacity, efficiency/performance of data transfer, in addition to either duplication of business rules for a mobile device or the risk of errors when disconnected data is fed back to the core application.

Due to space limitations, it is not always practical to replicate an entire dataset, such as an enterprise record database, on the mobile device. Certain solutions, such as data compression, can still result in large amounts of data replication. Filtering records (e.g., to remove records that are unlikely to be used) can improve storage, particularly for remote devices, which may not be able to store an entire database locally. Thus, the filtering of records ensures that the remote device stores what is most likely to be needed. The records on the remote device can be further updated using the remote device without network access and may be synchronized with the server when network access is reestablished. Filtering records can also reduce the amount of bandwidth used by a database by reducing the amount of data transmitted from the server to the remote device.

Figure 1:
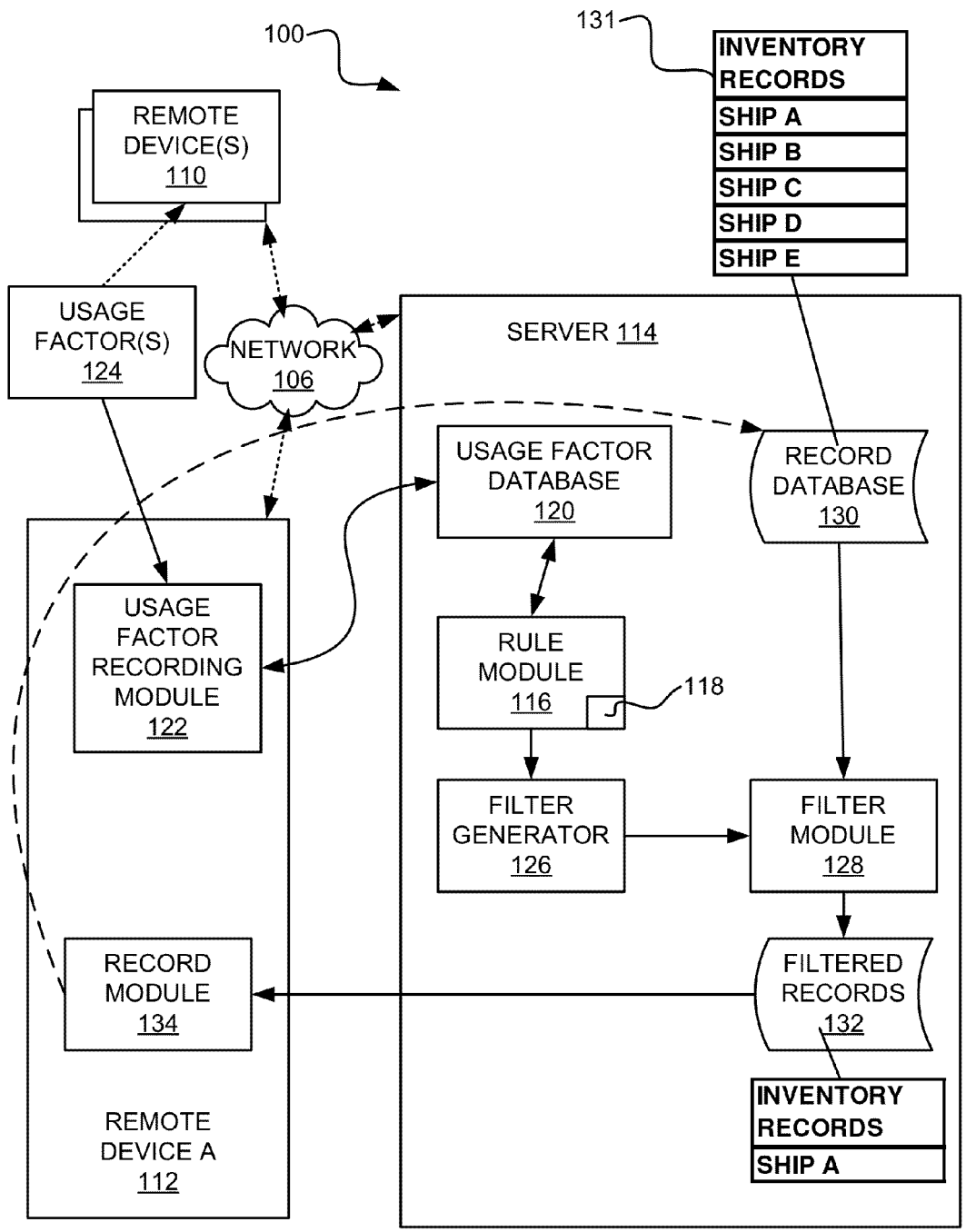
FIG. 1 depicts a block-level diagram of a computing system for filtering a plurality of records, according to various embodiments.

FIG. 1 depicts a block-level diagram of a computing system 100 for filtering a plurality of records, according to various embodiments. The computing system 100 can be used to facilitate the filtering of data for offline use. For instance, a remote device A (also referred to as remote device 112) can receive filtered records 132 from a record database 130 for use when network access is not possible, e.g. when on a ship where network access is unavailable, inconsistent or otherwise not practical. As an example used to illustrate different features of the various embodiments, a remote device "A" can conduct an inventory on a ship, e.g., SHIP A. The inventory can occur without network access by accessing (reading, adding or modifying) a local copy of data originating from a record database 130. The local copy of data can be synchronized with the record database 130 once network access is restored. The record database 130 can contain inventory records 131 for a plurality of ships. The inventory records 131 can be used by remote device A in order to conduct the inventory.

As discussed herein, the record database 130 can be relatively large, such that it is impractical (or impossible) to store a copy of the entire set of inventory records 131 on the remote device A. Aspects of the present disclosure are directed toward the selection and use of a filter to reduce the amount of data copied to the remote device A to a manageable size. In particular embodiments, the record database 130 can be filtered based on a usage factor 124 derived from one or more rules.

The computing system 100 can have one or more remote devices 110, including a remote device 112, and a server 114. The remote device 112 is shown as an example of a particular remote device, however, any number of the remote devices 110 can be part of the computing system 100. Generally, the remote devices 110, 112 can communicatively couple to the server 114 and both receive and transmit data from the server 114. In some instances, the remote devices 110, 112 may communicatively couple to the server 114 via a network 106, examples of which are described further herein.

The server 114 can include a rule module 116. The rule module 116 can receive rules from an application, e.g., the rules can be generated from user input to the application or automatically generated by the application. A rule can have a condition and a response to the condition. For example, the rule can be structured with a condition such as "IF location=SHIP A", and a response such as "THEN filter records=SHIP A". The rules can vary based on each user (or device) accessing the server 114. For instance, each user can have a respective set of rules where individual rules in the set can be common to other users or be unique to a particular user. The rule module 116 can hold any number of rules. For example, the rule module 116 can hold 1,000 rules and 30 rules can apply to a first user, and 140 rules can apply to a second user. The rule module 116 could hold 40 rules that apply to all users. Various combinations of rule sets are possible.

The rule module 116 can be configured to use a profile. A profile can be a set of rules for a particular user. The user can login to the remote device 110 and the server 114 can determine the specific rules that apply to the user. Each user can have different sets of rules that apply depending on the profile used.

The rule module 116 can include a rule module extractor 118. The rule module extractor 118 can be a part of the rule module 116 or it can be a separate module. The rule module extractor 118 can extract a condition from a particular rule. For example, in the above example, the rule module extractor 118 can extract the condition "IF location=SHIP A" to a usage factor database 120.

In various embodiments, a usage factor 124 can be derived from the condition. In the above example, the usage factor of location can be derived from the statement "IF location." The satisfaction of the usage factor can be a usage factor result, e.g., a location measurement. The location measurement can be "SHIP A". In various embodiments, an actual usage factor 124 from the remote device 112 can be measured to produce the usage factor result that is synchronized with the usage factor database 120. For example, if the usage factor 124 is a location, then the actual usage factor 124 can be measured by a GPS of the remote device 112. If the GPS of the remote device 112 is non-functional then the remote device 112 can indicate a blank in the space of location, use a last known location or use another method of location determination (e.g., based upon the location of an access point or cellular tower used by the remote device 112).

The remote device 112 can measure the actual usage factors 124 for the usage factor database 120 using a usage factor recording module 122. The usage factor recording module 122 can consult with the usage factor database 120 to determine which usage factors 124 to measure. In various embodiments, the usage factor database 120 can transmit targeted usage factors 124 to multiple remote devices 110, 112. For example, if the usage factor database 120 has the usage factors 124 of geographic location, available space, and network strength, then these usage factors 124 can be measured by all remote devices 110 using the usage factor recording module 122 of each remote device 110, 112. The usage factor recording module 122 can determine if the usage factor 124 is capable of being measured by the remote device 110, 112. For example, if there are no GPS capabilities on a remote device 110 or 112, then the geographic location cannot be measured and the usage factor recording module 122 can transmit a value such as "Location (Remote device A)=Invalid" to indicate to the usage factor database 120 that the geographic location cannot be measured.

In various embodiments, the targeted usage factors 124 may be preselected by the usage factor recording module 122. For example, if the usage factor database 120 has a geographic location usage factor, an available space usage factor, and a network strength usage factor, but the usage factor recording module 122 detects an absence of a GPS module on the remote device, i.e., that the remote device is incapable of measuring the geographic location usage factor, then the usage factor recording module 122 can avoid measuring the geographic location usage factor and sharing the geographic location nusage factor with the usage factor database 120.

The usage factor recording module 122 can collect information on one or more usage factors 124. Examples of usage factors 124 can be described more fully therein. The usage factors 124 measured by the usage factor recording module 122 can be transmitted to the usage factor database 120. For example, if the usage factor 124 is location, then the usage factor recording module 122 can transmit a location for the remote device to the usage factor database 120. Any previous location readings for the remote device can be ignored or discarded by the usage factor database 120.

In various embodiments, the rule module 116 can receive a usage factor with a usage factor result from the usage factor database 120. The usage factor result can correspond to a usage factor 124, such as location of a particular remote device, along with the associated value for the usage factor 124, e.g., SHIP A. The rule module 116 can take the usage factor result and use a filter generator 126.

The filter generator 126 can be a part of the rule module 116 or a separate module. The filter generator 126 can implement the response described herein. In various embodiments, the filter generator 126 can compare the usage factor 124 in the usage factor database 120 to the condition in the rule. For example, one condition could be "IF location (remote device A)=SHIP A." In this example, the filter generator 126 can search the usage factor database 120 for the location usage factor result for remote device A 112. If the location for remote device A 112 is SHIP A, then the condition is met and the response to the condition can be implemented on the server 114. However, if the location for remote device A 112 is SHIP B, then the condition is not met and the response if not implemented.

A filter module 128 can implement the response to the condition. In various embodiments, the filter module 128 can filter the results, i.e., the inventory records 131, from the record database 130 to obtain a filtered record 132. The filter module 128 can use the rule from the rule module 116 to filter the record database 130. For example, if the rule is "IF location(remote device A)=SHIP A, THEN copy records=SHIP A", then the filter module 128 can receive an indication that the condition is met from the filter generator 126 and copy the inventory records 131 by filtering out records that are not SHIP A from the record database 130 and thereby creating the filtered records 132. The filtered records 132 may be stored, at least temporarily, in a storage circuit or device, such as a buffer or a hard disc drive.

The filtered records 132 can be transmitted to the record module 134 of remote device A. Once the remote device A has the filtered records 132, the remote device A can use the local copy in the record module 134 irrespective of the presence of network access (e.g., whether a planned or an unexpected/sudden loss of network access). For example, if the records for SHIP A are inventory records for all equipment inside of the ship, then the remote device A can conduct an inventory without network access because the filtered records 132 are transmitted to the record module 134. Assuming that the inventory involves a user to indicate that the equipment is present, the presence of the equipment can be saved locally. Once network access is restored, e.g., when the ship returns to port, then the inventory records can be synchronized with the record database 130.

Figure 2:
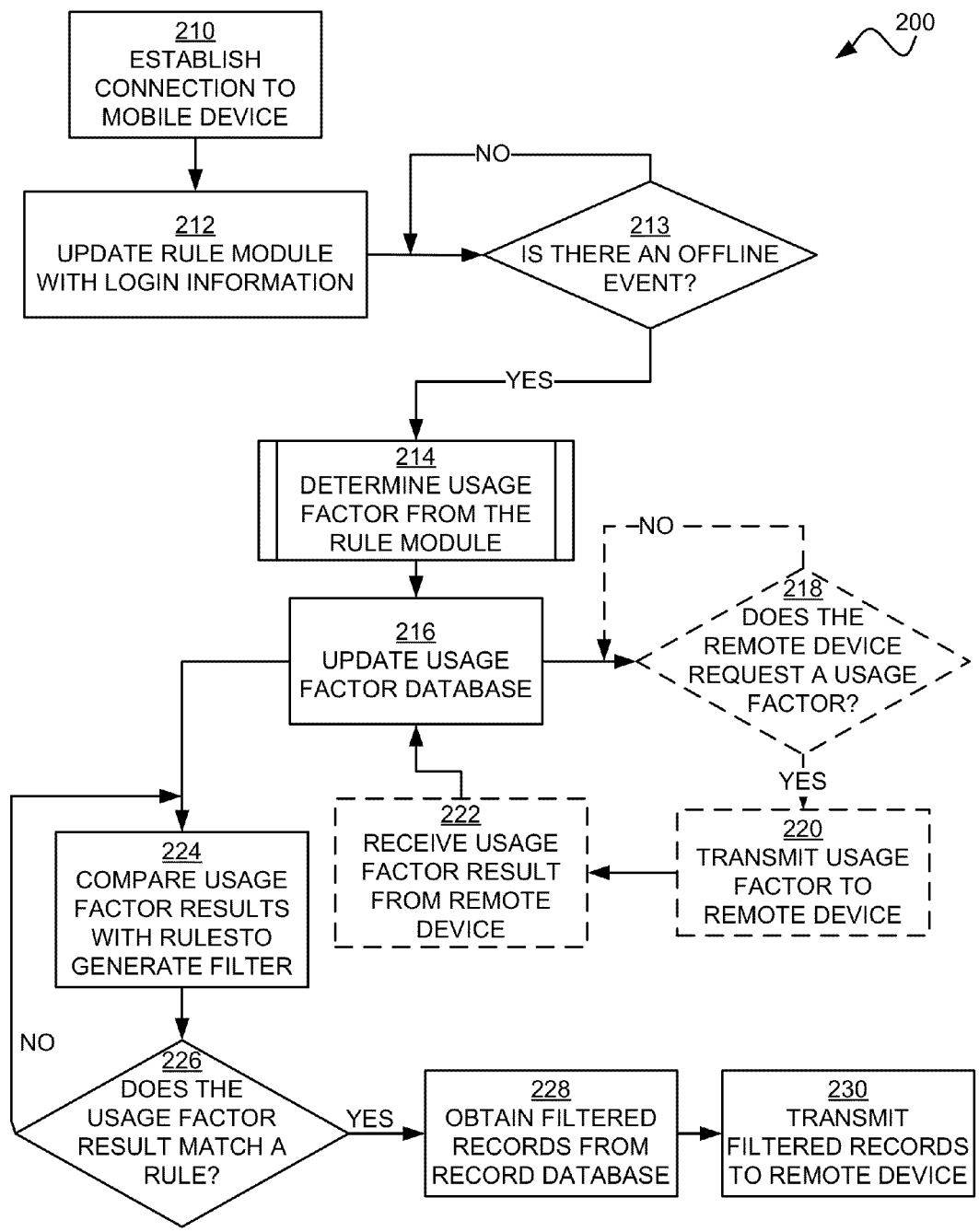
FIG. 2 depicts a flowchart of a method of filtering records to produce a filtered record that is transmitted to a remote device, according to various embodiments.

FIG. 2 depicts a flowchart of a method 200 of filtering records to produce a filtered record that is transmitted to a remote device, according to various embodiments. The method 200 can begin at operation 210. In operation 210, a server, e.g., the server 114 in FIG. 1, can establish a connection to a mobile device, e.g., a mobile device 110, 112 in FIG. 1. The connection can occur through a network or can be a physical connection to the server, e.g., a Universal Serial Bus connection. The connection can be capable of enabling the remote device and the server to communicate. In various embodiments, the remote device can initiate the connection with the server. After a connection is established between the server and the remote device, then the method 200 can continue to operation 212.

In operation 212, a rule module, e.g., rule module 116 from FIG. 1, can be updated using login information of a particular user. For example, a rule module can be loaded with a profile for a first user and a profile for a second user. A profile can contain a set of one or more rules associated with a particular user. For example, when accessed by a remote device, the profile can contain a rule for a particular user. In various embodiments, the rule can also include conditions that, when satisfied, result in a corresponding action or response. For instance, a condition could be if a location is within three meters of a wireless access point, then the remote device synchronizes its local database with the server. The condition(s) can be simple or relatively complex (e.g., multiple conditions can be grouped). For instance, the above condition can be further limited to only if a particular user logs into the server. Accordingly, the rules that apply to the first user do not necessarily apply to the second user. The first user can login using credentials which can load the first user's profile. After the rule module is updated with the login information, then the method 200 can continue to operation 213.

In operation 213, the rule module can determine if there is an offline event. In certain embodiments the offline event can indicate that the remote device may go offline sometime in the future. This indication can be based upon user input, an automated prediction (e.g., based upon usage history) and combinations thereof. For instance, the prediction can be based off of a history of the remote device using factors such as signal strength, a velocity vector, or location. For example, assuming the prediction is based off of the history of the remote device, if the remote device always loses signal once it boards a particular ship at a particular port, and the remote device has historically been at a particular ship every Wednesday at 0500 in the morning, then the rule module can determine that there is an offline event on Wednesday at 0500.

Another example of an offline event can be a signal strength that declines as a function of time. This might be relevant, for example, if the remote device's location is moving away from an access point at a constant speed, then the signal strength would be declining. The remote device can predict when the access point connection will be lost based on the declining signal strength as a function of time.

The time between the offline event and the loss of network access can be defined by the user or based on the amount of time it takes to upload data onto the remote device. Using the aforementioned example, if the time to load data into the remote device takes 1.5 hours, then the offline event would exist if the remote device's current time is 0329. According to various embodiments, if the remote device's current time is 0400, then the application may determine that the offline event does not exist because (e.g. where the partial transmission of the desired data is not effective in preparing for the loss of network access). In certain embodiments, the particular data being transferred can be prioritized to allow for more relevant data to be transferred first to mitigate incomplete data transfers (e.g., due to insufficient time before network loss).

The offline event can be determined by a signal map for network (e.g., cellular) coverage. Assuming a projected path, such as when driving or flying, the offline event can be based on the velocity vector of the remote device and a map of network coverage. Assuming that a predicted position based on the velocity vector would result in the remote device having poor network coverage, then a trigger event can be detected so that the remote device can be loaded with data while network access exists. If there is no offline event, then the method 200 can continue to monitor for an offline event in operation 213. If there is an offline event, then the method 200 can continue to operation 214.

In operation 214, a rule module can determine or identify a usage factor. The determined usage factor can then be measured by the remote device. In various embodiments, the usage factor can be determined by the remote device based on device capabilities. For example, if the remote device does not have a GPS sensor, then location is less likely to be measurable by the remote device (or it may be less accurate). The determination of the usage factor list can be described herein. After the usage factor list is determined, then the method 200 can continue to operation 216.

In operation 216, the usage factor database can be updated with the usage factors from the rule module. The usage factor database can hold usage factors as well as usage factor results. The usage factor result can be a result of a measurement of a usage factor for a remote device. For example, if the usage factor database contains usage factors for location, network latency, or location relative to another device for a particular remote device, then the usage factor database can be just the term "location (remote device)". The usage factor result can be "location (remote device)=docks".

After the usage factor database is updated in operation 216, the method 200 can update the usage factor database using the usage factor results collected by a remote device in operations 218, 220, and 222. Operations 218, 220, and 222 can be optional in response to the remote device requesting usage factors from the usage factor database. If the remote device requests usage factors, then the remote device can measure the usage factors described herein. In various embodiments, the remote device can also be configured to not request usage factors from the usage factor database and automatically make measurements based on capabilities of the remote device.

Operation 218 and 220 may be combined, according to various embodiments. In operation 218, the remote device can request a usage factor. In various embodiments, operation 218 depends on the remote device. The remote device can receive all of the usage factors from the server in various embodiments. Thus, the remote device can be blank as an initial state and unfamiliar as to which usage factors to record until instructed by the server. If there is no request, then the method 200 can cycle back until there is a request by a remote device. If there is a request, then the method 200 can continue to operation 220.

In operation 220, the usage factors can be transmitted to the remote device from the usage factor database. For example, the remote device can be instructed to measure all of the usage factors from the usage factor database, or merely a subset of the available usage factors. When the remote device is not capable of measuring the usage factor, the remote device can reply with a blank value (or other indication) for the usage factor result.

As an alternative to operation 218 and operation 220, the remote device may first determine the resources available to it and measure only the usage factors that it has the capability to measure. For example, the remote device can first determine that it has only a GPS capability, as well as a near field communication sensor to detect other remote devices and measure only the geographic location and the proximity usage factors. The usage factors can also be selected based upon parameters including, but not limited to, the identity of either the user or remote device, the type of connection to the remote device, the type of data stored in the database and combinations thereof.

Once the usage factors are measured to produce a usage factor result, then the method 200 can continue to operation 222. In operation 222, the server can receive the usage factor results from the remote devices. The usage factor results can be compiled into the usage factor database in operation 216. After the usage factor results are obtained in operation 216, then the method 200 can continue to operation 224.

In operation 224, a rule module on the server can compare the usage factor results obtained from the usage factor database, to a condition for a rule. For example, a usage factor result of "location(remote device)=SHIP A" can correspond to any measurement for the location of the particular remote device, e.g., "IF location (remote device)=SHIP A," and result in a match. The match can be determined in operation 226. If there is not a match, then the method 200 can continue to operation 224 where the results are compared until there is a match. If there is a match, then the method 200 can continue to operation 228.

In operation 228, records from the record database are filtered using the rule. Using an aforementioned example, if the rule is "IF location(remote device)=SHIP A, THEN copy SHIP A records", then the response, i.e., "THEN copy SHIP A records", would be implemented by a filter module. The filtered records can be transmitted to the remote device in operation 230. In various embodiments, the filtered records can be prioritized based on the rules. For example, if the rule is related to the predicted duration of network access and if there are 10 records to transmit but the remote device can only accommodate 9 records, then the record associated with the highest predicted duration of network access can have the lowest priority since the record can have more leeway in waiting to upload. After the filtered records from the record database are obtained, then the method 200 can transmit the filtered records to the remote device in operation 230.

Figure 3:
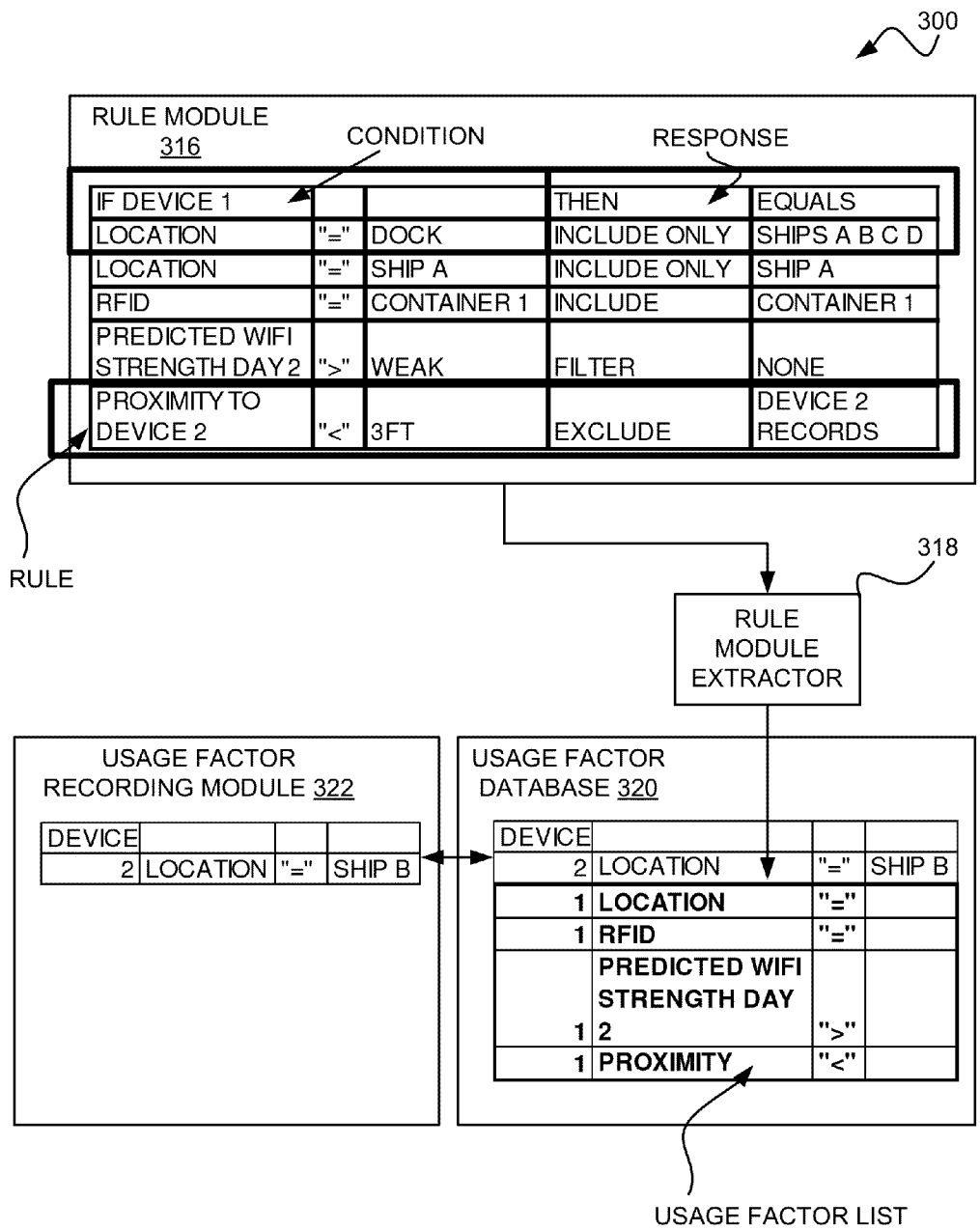
FIG. 3 depicts a method of determining a usage factor from a rule using components from a server, according to various embodiments.

FIG. 3 depicts a block diagram 300 of how a usage factor is determined from a rule using components from a server, according to various embodiments. The block diagram 300 can correspond to operation 214 from FIG. 2. Components of FIG. 3 can correspond to components of FIG. 1, but are not necessarily limited thereto. For example, the rule module 316, the rule module extractor 318, the usage factor database 320, and the usage factor recording module 322 can correspond to the rule module 116, the rule module extractor 118, the usage factor database 120, and the usage factor recording module 122 from FIG. 1.

The rule module 316 can contain one or more rules. A sample rule is highlighted where "IF proximity to a remote device 2(remote device 1)<3 ft, THEN exclude remote device 2 records". The rule module extractor 318 can take the rule and reduce the rule to a condition, i.e., IF proximity to a remote device 2(remote device 1)<3 ft. The condition can further include the usage factor (not shown), e.g., "device1 (location)." The usage factors for the rules can be compiled into the usage factor database 320. In various embodiments, the usage factors can be grouped into a usage factor list, which can be optional. The usage factor list can be a collection of usage factors that are grouped according to a parameter, e.g., the remote device the rule applies to, or the remote device that has the capability to measure the usage factor.

In various embodiments, the usage factor list can be received by the remote device to measure the usage factor using a usage factor recording module 322. As discussed herein, the usage factor recording module 322 can use other measurement methods for measuring a usage factor. In the block diagram 300, the usage factor recording module 322 for a device 2 can measure the location as "SHIP B" and transmit the location for device 2 to the usage factor database 320.

Figure 4:
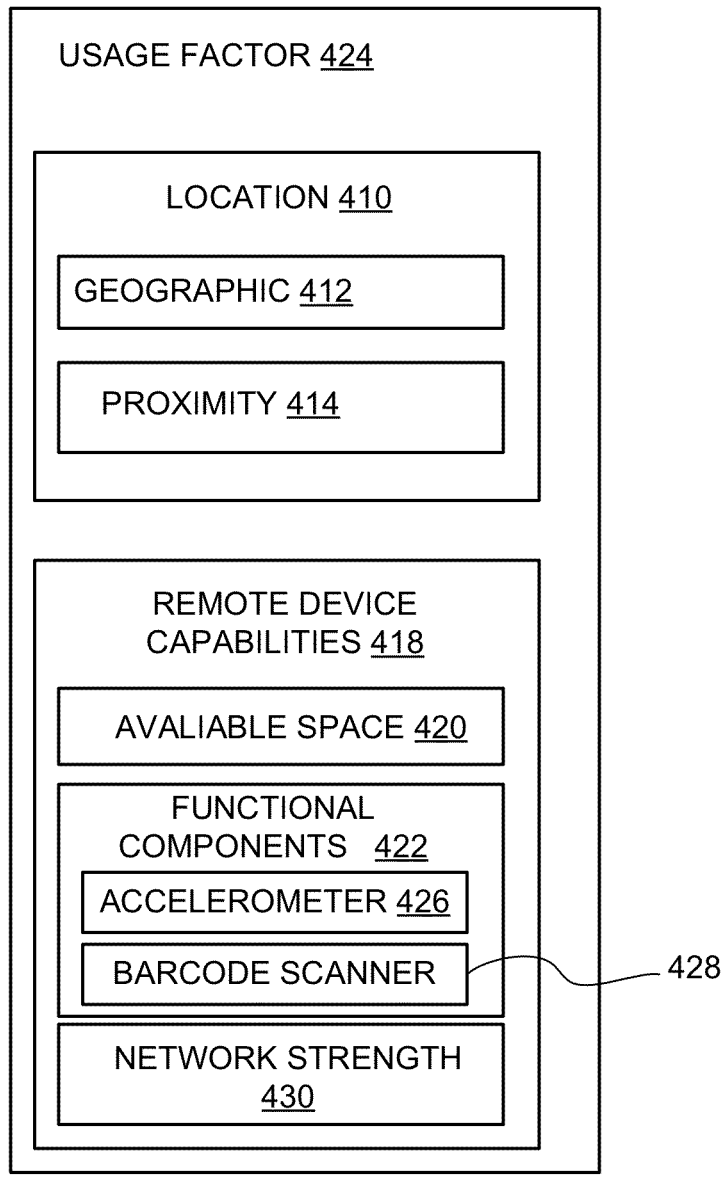
FIG. 4 depicts a sample of usage factors, according to various embodiments.

FIG. 4 depicts a sample of usage factors 424, according to various embodiments. Consistent with certain embodiments, the usage factor 424 can correspond to the usage factor from various figures and embodiments, such as usage factor 124 from FIG. 1. The usage factors 424 described herein are provided as an example and are not intended to be limiting. The usage factors 424 can be based on location or device, i.e., remote device capabilities 418.

If the usage factors 424 are based on location 410, then the location can be a geographic location 412. The geographic location 412 can refer to a physical position based on a map. For example, a geographic location 412 can refer to a user located at a ship in a particular shipping port. The location 410 can also be a proximate location 414 or relative to an object. For example, the proximate location 414 can be where a remote device is located within 3 feet of another remote device or a network access point.

The usage factors 424 can also include the capabilities of the remote device 418. Capabilities can generally refer to the usage factors that can be measured by the remote device. The usage factors can include the available storage or memory space 420 on the remote device. For example, the available space 420 usage factor can be used to filter records when the available space is below a certain value (or to increase the amount of filtering). The usage factors 424 can include the network strength 430, or connection type (e.g., 3G, 4G, WiFi), of the remote device. For example, the network strength 430 can be used to select the records that have large file sizes in response to a strong network strength.

The usage factors 424 can include readings from functional components 422, including an accelerometer 426 or a barcode scanner 428. Readings from the accelerometer 426 can be used to select only inventory records of items below the deck of a ship when the accelerometer 426 detects the remote device descending in an elevator. The barcode scanner 428 usage factor can be used in a rule that retrieves only records that were scanned by the barcode scanner in the past by the remote device.

Figure 5:
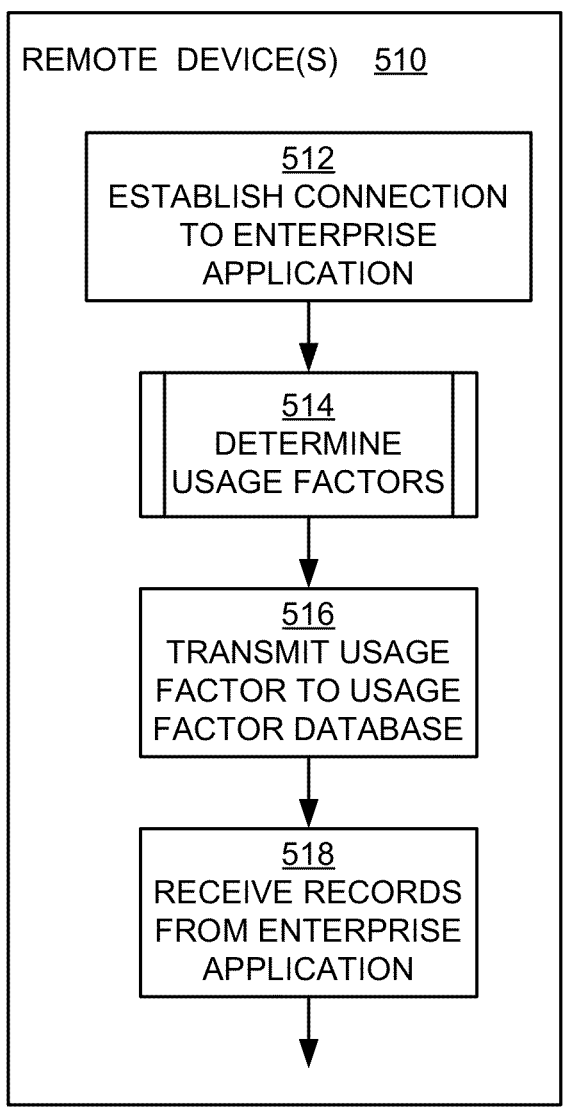
FIG. 5 depicts a method of retrieving records from a server for a remote device, according to various embodiments.

FIG. 5 depicts a method 500 of retrieving records from a server for a remote device, according to various embodiments. The method 500 can occur within the context of the remote device 510. In embodiments, the remote device 510 can correspond to the remote device 110 from FIG. 1. The method 500 can begin at operation 512.

In operation 512, the remote device can establish a connection with an enterprise application. The enterprise application can be an application that manages the placement of records and implements the method of filtering records. In various embodiments, the enterprise application can be hosted by the server. Once a connection is established, then the method 500 can continue to operation 514.

In operation 514, the remote device 510 can determine which usage factors to use. In various embodiments, the remote device 510 can push the usage factors that it is capable of measuring to the server. The remote device 510 can request usage factors to measure from the server. Operation 514 can also include the measurement of a usage factor by the remote device 510. After the usage factors are determined in operation 514, the method 500 can continue to operation 516.

In operation 516, the remote device 510 can transmit the measured usage factors to a usage factor database housed on the server. The remote device can retain copies of the measurement locally. In various embodiments, the remote device can update the usage factors offline and transmit the usage factors to the server when the network connection is restored. After the usage factor is transmitted in operation 516, the method 500 can continue to operation 518.

In operation 518, the remote device 510 can receive filtered records from the enterprise application on the server. The filtered records can be filtered from a larger record database. The filtered records can be applicable to the remote device. For example, if the remote device is going to SHIP A to conduct an inventory, then the filtered records can be an inventory of all the items on ship A. After operation 518, then the method 500 can end.

Figure 6:
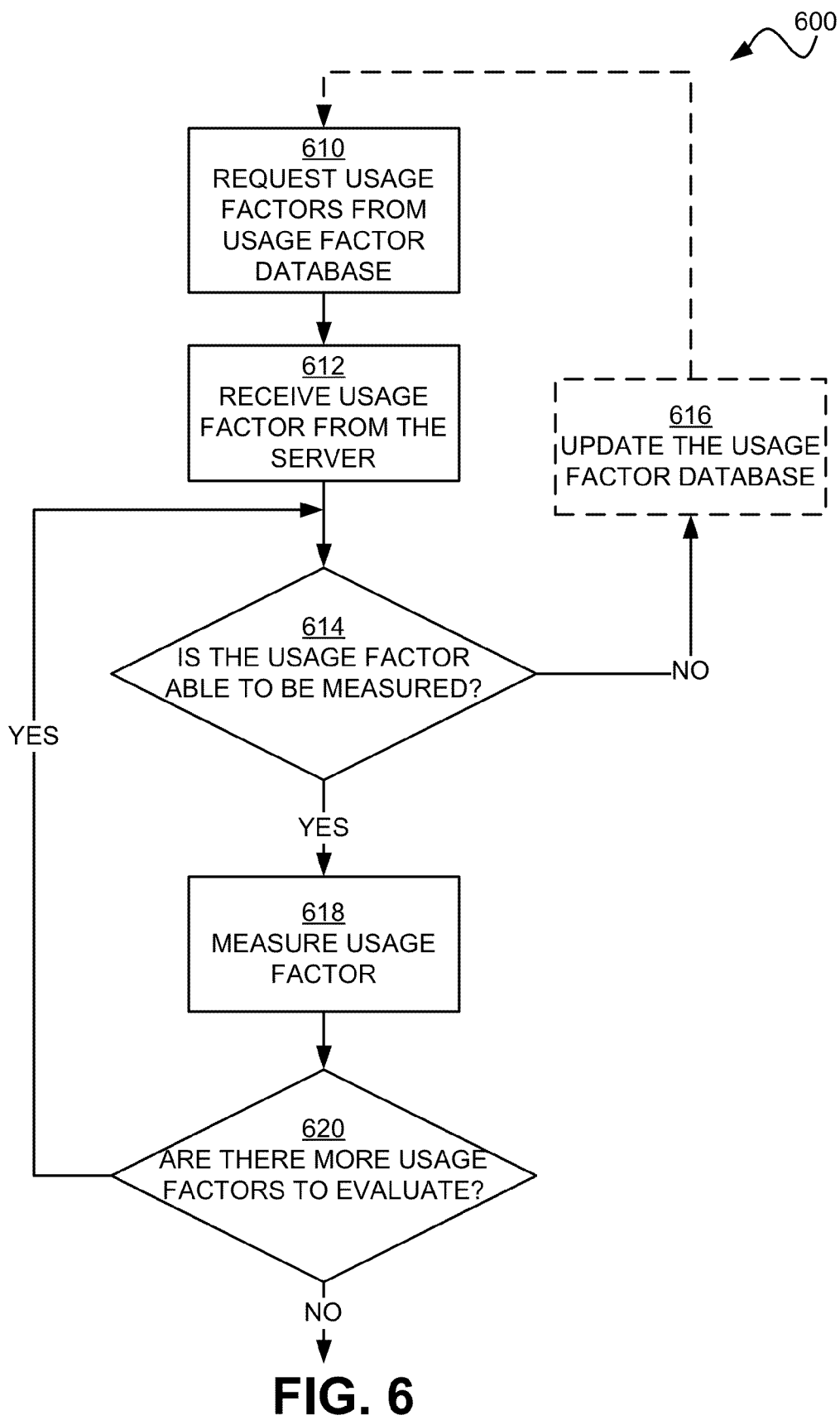
FIG. 6 depicts a method of determining a usage factor for a remote device, according to various embodiments.

FIG. 6 depicts a method 600 of determining a usage factor for a remote device, according to various embodiments. In some embodiments, the method 600 can correspond to operation 514 from FIG. 5. The method 600 can begin at operation 610. In operation 610, a remote device can request usage factors from the server, specifically the usage factor database. In various embodiments, the request can be accompanied by a list of usage factors that the remote device is able to measure. Once the usage factors are requested from the server, then the method 600 can continue to operation 612.

In operation 612, the remote device can receive the usage factors to measure from the server. In various embodiments, the remote device can receive a usage factor list from the server that includes a listing of all of the applicable usage factors for the remote device to measure.

In operation 614, the remote device can determine if the usage factor is capable of being measured. The remote device can define capable of being measured by capabilities of hardware and software components present on the remote device, as well as by the presence or absence or external inputs (e.g., a GPS signal or wireless access point). In various embodiments, the remote device can be capable of measuring a location without a GPS sensor by using a feature such as network triangulation. Likewise, the remote device can be capable of measuring an inventory number with a keypad instead of a barcode scanner. In various embodiments, the enterprise application can define the capabilities of a remote device. For example, if the enterprise application will only accept a GPS measurement for location. If the remote device cannot be measured with the remote device, then method 600 can continue to operation 616.

In operation 616, the remote device can send an indication to the usage factor database on the server that the usage factor cannot be measured. In various embodiments, operation 616 can be optional, so that the remote device does not have to send an indication that the usage factor cannot be measured. The server can update the usage factor database to associate a limitation of measurement to the remote device to develop a history. After the usage factor database is updated, then the method 600 can continue to operation 610 where the usage factors can be requested by the mobile device.

If the usage factor can be measured by the remote device, then the method 600 can continue to operation 618 where the usage factor is measured. Once measured, the usage factor can be stored in a buffer or a cache or otherwise stored as a local copy. The usage factor can be transmitted to the usage factor database. Once the usage factor is measured in operation 618, then the method 600 can continue to operation 620.

In operation 620, the remote device can determine if there are more usage factors to measure. If there are more usage factors to measure, then the method 600 can continue to operation 614. If there are not any more usage factors to measure, then the method 600 can stop. In various embodiments, operation 614, 618, and 620 can be performed simultaneously for groups. For example, the remote device can receive all of the usage factors in operation 612, and measure the usage factors and transmit the usage factors to the usage factor database as a group as opposed to one at a time.

FIG. 7 depicts a block diagram of automated computing machinery, according to an embodiment. The computing machinery can include example computer 752 useful in record filtering according to embodiments of the present invention. The computer 752 of FIG. 7 includes at least one computer processor 756 or 'CPU' as well as random access memory 768 ('RAM') which is connected through bus adapter 758 to processor 756 and to other components of the computer 752.

Stored in RAM 768 is a management agent application 701, a module of computer program instructions designed for filtering records according to embodiments of the present invention. Also stored in RAM 768 is an operating system 754. Operating systems useful for record filtering according to embodiments of the present invention include UNIX®, Linux®, Microsoft XP™, AIX®, IBM's i5/OS™, and others. The operating system 754 and management agent application 701 are shown in RAM (768), but many components of such software typically are stored in non-volatile memory also, such as, for example, on a disk drive 770.

The computer 752 can also include disk drive adapter 772 coupled through expansion bus 760 and bus adapter 758 to processor 756 and other components of the computer 752. Disk drive adapter 772 connects non-volatile data storage to the computer 752 in the form of disk drive 770. Disk drive adapters useful in computers for filtering records according to embodiments of the present invention include Integrated Drive Electronics ('IDE') adapters, Small Computer System Interface ('SCSI') adapters, and others. Non-volatile computer memory also may be implemented for as an optical disk drive, electrically erasable programmable read-only memory (so-called 'EEPROM' or 'Flash' memory), RAM drives, and so on.

The example computer 752 includes one or more input/output ('I/O') adapters 778. I/O adapters implement user-oriented input/output through, for example, software drivers and computer hardware for controlling output to display devices such as computer display screens, as well as user input from user input devices 781 such as keyboards and mice. The example computer 752 includes a video adapter 709, which is an example of an I/O adapter specially designed for graphic output to a display device 780 such as a display screen or computer monitor. Video adapter 709 is connected to processor 756 through a high speed video bus 764, bus adapter 758, and the front side bus 762, which is also a high speed bus.

The example computer 752 includes a communications adapter 767 for data communications with other computers 710, e.g., mobile devices, and for data communications with a data communications network 700. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for virtual machine migration according to embodiments of the present invention include modems for wired dial-up communications, Ethernet (IEEE 802.3) adapters for wired data communications network communications, and 802.77 adapters for wireless data communications network communications.

A mobile device 710 can have local programs that are separate from the management agent application 701. The local programs can work in conjunction with the management agent application 701. The mobile device 701 can contain the usage factor recording module 122 or the record module 134 as discussed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

What is claimed is:

1. A computer-implemented method for controlling data transmission between an online-accessible database containing a plurality of records and a remote device, the method comprising:
   identifying a set of one or more rules in response to an offline event for the remote device;
   determining, based upon the offline event, one or more usage factors from the set of one or more rules that identify;
   measuring, using the remote device, the determined one or more usage factors;
   generating a filter from the set of one or more rules and based on the measured one or more usage factors;
   filtering the plurality of records from the online-accessible database to produce a set of filtered records; and
   transmitting the set of filtered records to the remote device.

2. The computer-implemented method of claim 1, wherein the determining the one or more usage factors also includes:
   determining a condition of the set of one or more rules;
   identifying a particular usage factor for the condition; and
   transmitting the particular usage factor to a usage factor database.

3. The computer-implemented method of claim 1, wherein measuring the one or more usage factors includes accessing a usage factor list.

4. The computer-implemented method of claim 1, wherein measuring the one or more usage factors includes updating a usage factor database in response to an absence of a measurement for the one or more usage factors.

5. The computer-implemented method of claim 1, wherein the usage factor is a location for the remote device.

6. The computer-implemented method of claim 1, wherein the offline event includes an indication that a remote device will lose network access.

7. The computer-implemented method of claim 6, further including generating the indication from a prediction that is based on past usage for the remote device.

8. The computer-implemented method of claim 6, wherein the indication includes a signal strength that is for a network connection to the remote device and that declines as a function of time.

* * * * *